United States Patent
Kim et al.

(10) Patent No.: US 9,676,913 B2
(45) Date of Patent: Jun. 13, 2017

(54) MANUFACTURING METHOD OF POROUS POLYMER FILM USING VANADIUM OXIDE NANOWIRE, AND POROUS POLYMER FILM PREPARED THEREFROM

(71) Applicant: Korea University Research and Business Foundation, Seoul (KR)

(72) Inventors: Taek-Seung Kim, Seoul (KR); Hee-Deung Park, Gyeonggi-do (KR); Gyu-Tae Kim, Gyeonggi-do (KR); Man-Joong Han, Seoul (KR); Yun-Jeong Kim, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 152 days.

(21) Appl. No.: 14/296,753

(22) Filed: Jun. 5, 2014

(65) Prior Publication Data
US 2015/0038608 A1    Feb. 5, 2015

(30) Foreign Application Priority Data
Jul. 31, 2013    (KR) .......................... 10-2013-0090648

(51) Int. Cl.
*C08J 5/22*    (2006.01)
*C08J 5/18*    (2006.01)
(Continued)

(52) U.S. Cl.
CPC .............. *C08J 5/2218* (2013.01); *C08J 5/18* (2013.01); *B01D 67/009* (2013.01);
(Continued)

(58) Field of Classification Search
CPC .... B01D 67/0009; B01D 2323/24; C08J 5/18; C08J 9/26
See application file for complete search history.

(56) References Cited

U.S. PATENT DOCUMENTS

| | | | |
|---|---|---|---|
| 7,662,300 B1 * | 2/2010 | Cho ..................... | B01D 67/003 216/56 |
| 2006/0257637 A1 * | 11/2006 | Pereira .................. | B82Y 10/00 428/221 |
| 2012/0129682 A1 * | 5/2012 | Yun ........................ | B82Y 40/00 502/5 |

FOREIGN PATENT DOCUMENTS

| | | | |
|---|---|---|---|
| CN | 101857193 A | * | 10/2010 |
| KR | 1020070099778 | | 10/2007 |
| KR | 1020100123290 | | 11/2010 |

OTHER PUBLICATIONS

Machine translation of CN-101857193-A obtained from the European Patent Office on Nov. 12, 2015.*

* cited by examiner

*Primary Examiner* — Melissa Rioja
(74) *Attorney, Agent, or Firm* — Duane Morris LLP; J. Rodman Steele, Jr.; Gregory M. Lefkowitz

(57) ABSTRACT

This patent is provided a method for producing a porous polymer film using vanadium oxide nanowires, and a porous polymer film obtained from the method. The method allows control of a uniform pore size and density through a simple process including the steps of: adding an ion exchanger to deionized water to perform acidification and adding a vanadate compound thereto to grow vanadium oxide nanowires by a sol-gel process; mixing the resultant solution of grown nanowires with a polymer solution to provide a mixed solution of nanowires; pouring the mixed solution of nanowires to a mold, followed by drying and curing, to form a film; and etching the resultant film with an etching solution to remove the vanadium oxide nanowires.

7 Claims, 6 Drawing Sheets

(51) Int. Cl.
*C08J 9/26* (2006.01)
*B01D 67/00* (2006.01)
(52) U.S. Cl.
CPC ............ *B01D 2323/21* (2013.01); *C08J 9/26* (2013.01); *C08J 2375/04* (2013.01); *C08J 2439/06* (2013.01)

MANUFACTURING METHOD OF POROUS POLYMER FILM USING VANADIUM OXIDE NANOWIRE, AND POROUS POLYMER FILM PREPARED THEREFROM

CROSS-REFERENCE TO RELATED APPLICATIONS

This application claims priority under 35 U.S.C. §119 to Korean Patent Application No. 10-2013-0090648 filed on Jul. 31, 2013 in the Korean Intellectual Property Office, the disclosure of which is incorporated herein by reference in its entirety.

TECHNICAL FIELD

The following disclosure relates to a method for producing a porous polymer film using vanadium oxide nanowires, which allows control of a uniform pore size and density by a simple process, and a porous polymer film obtained from the same method.

BACKGROUND

Porous polymer films that allow the flow of a fluid are classified, depending on pore sizes that the materials have, into mioroporous polymer films having a pore size less than 2 nm, mesoporus polymer films having a pure size of 2-50 nm, and macroporous polymer films having a pore size greater than 50 nm. Among them, in the case of mesoporous polymer films, the mesopores are so largo that they allow a fluid to flow freely therethrough and the films have a relatively large surface area where a fluid is in contact with a porous polymer film, and thus they have been given many attentions as materials for water treatment.

Methods that have been used to date for producing polymer films include a sintering method in which polymer powder is introduced to a mold, heating the polymer powder to a temperature slightly lower than its moiling point and sintering is carried out by using a pressurizer; a phase inversion method, such as a non-solvent induced phase inversion method, vapor phase induced phase inversion method and a thermally induced phase inversion method; an orientation method in which a crystalline polymer is drawn to impart porosity thereto; and a track etching method. However, the sintering method, phase inversion method and orientation method have a difficulty in controlling the pore size and density, and the track etching method allows formation of uniform and consistent pores but requires expensive equipment and a complicated manufacturing process.

Korean Patent Laid-Open No. 2010-0123290 (2010 Nov. 24) discloses a method for producing a porous polyimide film, including the steps of: growing gold nanowires (used as catalyst seeds) on a silicon substrate by using chemical vapor deposition (CVD); pouring a polyimide solution to the substrate on which the gold nanowires protrude; curing the substrate on which the polyimide solution is coated to form a film; and removing the nanowires incorporated to the polyimide film by selective etching. Although the method for producing a porous polyimide film provides a uniform pore size, the method requires a two-step etching process and an additional step of removing gold nanoparticles and should be carried out under the consideration of the thickness of the porous polyimide film as a final product. Further, the method uses gold, resulting in an increase in cost utilizes a CVD process requiring expensive equipment, and is not amenable to scale-up.

In addition, Korean Patent Laid-Open No. 2007-0099778 (2007 Oct. 10) discloses a method for producing a porous material, including the steps of: providing a porous template including a plurality of pores; forming nanostructures by using the template through a solid-liquid-solid (SLS) process or vapor-liquid-solid (VLS) process; removing the template; dispersing the resultant nanostructures to a new casting or precursor material; orienting the nanostructures in a predetermined direction; and removing the nanostructures by etching. Although the method for producing a porous material provides a uniform pore size, it has a difficult in carrying out the step of forming nanostructures by introducing a gas, requires expensive equipment, and uses a complicated process for producing nanostructures.

Therefore, a novel method that allows control of a uniform pore size and density merely by using a simple process is required.

SUMMARY

An embodiment of the present invention is directed to providing a method for producing a porous polymer film using vanadium oxide nanowires, which allows control of a uniform pore size and density by a simple process.

Another embodiment of the present invention is directed to providing a porous polymer film obtained from the above method.

In one general aspect, there is provided a method for producing a porous polymer film using vanadium oxide nanowires, including the steps of: (A) adding an ion exchanger to deionized water to perform acidification and adding a vanadate compound thereto to grow vanadium oxide nanowires by a sol-gel process; (B) mixing the resultant solution of grown nanowires with a polymer solution to provide a mixed solution of nanowires; (C) pouring the mixed solution of nanowires to a mold, followed by drying and curing, to form a film; and (D) etching the resultant film with an etching solution to remove the vanadium oxide nanowires.

In step (A), the vanadate compound and ion exchanger may be mixed in a weight ratio of 1:5-30.

In step (A), the ion exchanger may perform acidification to a pH of 2.0-2.5.

In step (A), the vanadate compound may be ammonium (meta)vanadate or sodium vanadate.

In step (B), the polymer solution may be a polyurethane solution, polyethylene solution, polysulfone solution, polyvinylidene fluoride or a copolymer thereof.

In step (B), the polymer solution may be used in an amount of 10-30 parts by weight per part by weight of the vanadate compound.

In step (B), a surfactant may be further added to the mixed solution of nanowires.

In step (B), the surfactant may be mixed in an amount of 10-70 parts by weight based on 100 parts by weight of the polymer solution.

In the porous polymer film, the pores may have a rectangular column shape.

The pores may be formed to have a width of 2-8 nm, a length of 10-30 nm and a height of 15-50 μm.

In another general aspect, there is provided a porous polymer film obtained by the method disclosed herein.

The method for producing a porous polymer film using vanadium oxide nanowires disclosed herein allows production of a porous polymer film having nano-sized pores through a simple process as compared to the methods for producing a porous polymer film according to the related art. Particularly, the method disclosed, herein allows control of a uniform pore size and density, thereby providing a porous polymer film having various pore sizes and densities.

In addition, the porous polymer film disclosed herein may be used as a separator film for treatment of gases and water, dust-protecting masks and yellow dust-protecting masks, and as lining materials for waterproof and air-permeable clothes.

BRIEF DESCRIPTION OF THE DRAWINGS

FIG. 5b is a graph illustrating the ratio of removal of GNP permeating through each of the porous polymer films in FIG. 5a.

DETAILED DESCRIPTION OF EMBODIMENTS

In one aspect, there is provided a method for producing a porous polymer film using vanadium oxide nanowires,
which allows control of a uniform pore size and density by a simple process. In another aspect, there is provided a porous polymer film obtained from the same method.

Hereinafter, the present invention will be explained in detail with reference to FIG. 1.

Figure 1A:
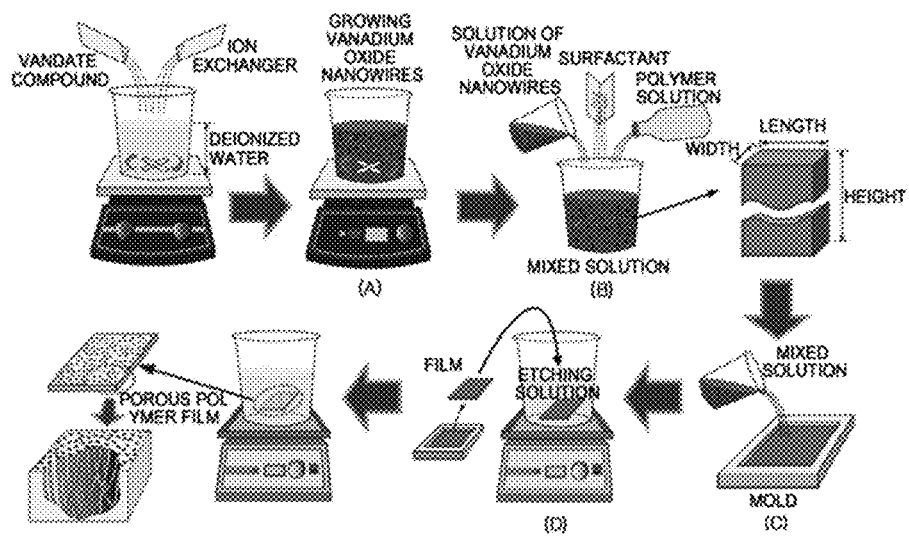
FIG. 1a is a flow chart illustrating the method for producing a porous polymer film using vanadium oxide nanowires according to an embodiment of the present invention.
Figure 1B:
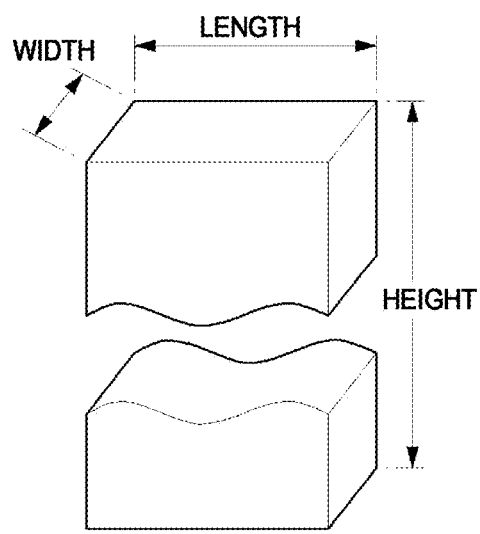
FIG. 1b shows the vanadium oxide nanowires obtained according to an embodiment of the present invention.

As shown in FIG. 1, the method for producing a porous polymer film using vanadium oxide nanowires includes the steps of: (A) adding an ion exchanger to deionized water to perform acidification and adding a vanadate compound thereto to grow vanadium oxide nanowires by a sol-gel process; (B) mixing the resultant solution of grown nanowires with a polymer solution to provide a mixed solution of nanowires; (C) pouring the mixed solution of nanowires to a mold, followed by drying and curing, to form a film; and (D) etching the resultant film with an etching solution to remove the vanadium oxide nanowires.

First, in step (A), an ion exchanger is added to deionized water to carry out acidification to a pH of 2.0-2.5, and then a vanadate ($XVO_4$) compound is further added thereto and the resultant mixture is snaked for 5-7 hours. In this manner, vanadium oxide ($V_2O_5$) nanowires are grown in a solvent phase (deionized water) by way of self-assemblage through a sol-gel process.

The vanadium oxide product obtained by mixing the ion exchanger with vanadate compound is grown into vanadium oxide nanowires. Since the height of nanowires is substantially in proportion to the reaction time in a solvent phase, it is possible to control the height of nanowires with ease by adjusting the reaction time. Particularly, since vanadium oxide nanowires are grown in height at a rate of 0.45-0.5 µm/day at 45-55° C., it is possible to obtain vanadium oxide nanowires with a height of 16-50 µm after the lapse of about 30-90 days. Thus, it is possible to obtain a polymer film with a predetermined thickness. When the vanadium oxide nanowires are grown at a temperature lower than the above range, growth of the nanowires through self-assemblage proceeds slowly. On the other hand, when the vanadium oxide nanowires are grown at a temperature higher than the above range, growth of the nanowires proceeds too rapidly.

The acidic ion exchanger is a material having acid groups sufficient to provide cations in the solvent, and ionizes a precursor, such as a vanadate compound, to produce vanadium oxide. Herein, acidification is carried out preferably to a pH of 2.0-2.5.

Particular examples of the vanadate compound include ammonium (meta)vanadate or sodium vanadate, preferably ammonium (meta)vanadate. The reaction between such a vanadate compound and the ion exchanger in a solvent produces vanadium oxide charged negatively due to the presence of hydroxyl groups. Thus, vanadium oxide nanowires float in an aqueous solution phase and grow through self-assemblage.

The vanadate compound and ion exchange are mixed in a weight ratio of 1:5-20, preferably 1:7-15. When the amount of ion exchanger is less than the lower limit based on the vanadate compound, the amount of cations provided for the reaction is too small to carry out ionization of the vanadium compound and production of vanadium oxide. On the other hand, when the amount of ion exchanger is greater than the upper limit, the yield of vanadium oxide converted from the vanadate compound becomes too low.

Next, in step (B), the solution of nanowires grown in step (A) is mixed with a polymer solution and the mixed solution is shaked for 1-3 hours at 23-27° C. to provide a mixed solution of nanowires. Herein, a surfactant may be further added to the mixed solution of nanowires.

The polymer solution is one forming a polymer film upon curing. There is no particular limitation in polymer solution, as long as it may be applied to water treatment or gas filtering processes. However, preferred examples of the polymer solution include a polyurethane solution, polyethylene solution, polysulfone solution, polyvinylidene fluoride solution or a copolymer thereof, a polyurethane solution being more preferred.

The polymer solution is used in an amount of 10-30 parts by weight, preferably 15-25 parts by weight per part by weight of the vanadate compound. When the amount of polymer solution is less than the lower limit based on the vanadate compound, pores are formed in the polymer film in an excessively large amount, resulting in degradation of durability. On the other hand, when the amount of polymer solution is greater than the upper limit, pores are formed in an excessively small amount, resulting in degradation of filtering qualify.

The surfactant is added in order to improve the hydrophilic property, viscosity and durability of a porous polymer film, and to enhance the chemical stability by preventing the decomposition of vanadium oxide nanowires. Particular examples of the surfactant include at least one selected from the group consisting of polyvinyl pyrrolidone (PVP), tetradecyltrimethylammonium bromide (TTAB) and cetyl trimethylammonium bromide (CTAB), polyvinyl pyrrolidone (PVP) being preferred.

The surfactant is used in an amount of 10-70 parts by weight, preferably 20-40 parts by weight based on 100 parts by weight of the polymer solution. When the amount of surfactant is less than the lower limit, vanadium oxide nanowires may react with the polymer to cause decomposition. On the other hand, when the amount of surfactant is greater than the upper limit, the polymer becomes have increased viscosity, thereby making it difficult to carry out demolding of the film, and the surfactant may cause formation of linear stripes on the polymer.

Then, in step (C), the mixed solution of nanowires obtained from step (B) is poured Into a mold, and dried and cured for 10-15 hours at 23-26° C. to form a film (thin film). The thickness of film may be controlled as desired.

There is no particular limitation in the mold, as long as it is separated easily from the cured film, and a Teflon mold is preferred.

Then, in step (D), the film obtained from step (C) is added to an etching solution and snaked for 5-8 hours so that the vanadium oxide nanowires are removed through etching. In this manner, it is possible to obtain a porous polymer film.

There is no particular limitation In the etching solution, as long as it is capable of etching the vanadium oxide nanowires, and 1-5% aqueous nitric acid or hydrochloric acid solution is preferred.

The porous polymer film obtained as described above includes pores having a shape of a rectangular column that is the same as the vanadium oxide nanowires. The rectangular column-shaped pores formed in a porous polymer film for use in water treatment can remove a larger amount of fine contaminants and ensure a larger treatment flux, as compared to the other pores having a different shape, such as a cylindrical shape, and the same area. For example, a polymer film including rectangular column-shaped pores of 4 nm×20 nm (width×length) has an area of 80 nm$^2$, which is similar to the area (78.5 nm$^2$) of a polymer film including cylindrical pores with a diameter of 10 nm. This means that the two films have the same amount of water (flux) permeating through each film per unit pore. However, when removing contaminants of 5 nm particles, the rectangular pores of 4 nm×20 nm are capable of removing 5 nm particles, while the circular pores with a diameter of 10 nm cannot remove 5 nm particles but allow the particles to permeate therethrough. In order to remove 5 nm particles, circular pores with a diameter of 5 nm should be used. However, in this case, such pores lead to an area of 19.6 nm$^2$ and the amount of water (flux) permeating therethrough is smaller by 60.4 nm$^2$ as compared to the rectangular pore-containing polymer film having an area of 80 nm$^2$. As a result since the polymer film having rectangular shaped pores can remove, fine contaminant particles with a size larger than 4 nm and provide a larger area through which water passes as compared to circular pores with a diameter of 4 nm, it shows higher treatment flux.

In addition, the pore size is the same as or slightly larger than the size of vanadium oxide nanowires. Particularly, the pores are formed preferably to have a width of 2-8 nm, a length of 10-30 nm and a height of 15-50 μm. The pores with a width of 2-8 nm can exclude a large amount of fine contaminants. The pores with a length of 10-30 nm can increase the treatment flux.

When the pore width is less than the lower limit, it is difficult for water to permeate through such pores, resulting in a drop in treatment flux. On the other hand, when the pore width is greater than the upper limit, fine contaminants can permeate through the polymer film with ease, and thus the contaminants cannot be filtered out When the pore length is less than the lower limit, it is difficult for water to permeate through such pores, resulting in a drop in treatment flux. On the other hand, when the pore length is greater than the upper limit, line contaminants can permeate through the polymer film with ease, and thus the contaminants cannot be filtered out and the distance between adjacent pores is so small that the film durability may be degraded and the film may be damaged easily.

Further, in the porous polymer film disclosed herein, it is possible to control the density of pores and treatment flux by adjusting the concentration of vanadium oxide nanowires.

The examples and experiments will now be described. The following examples and experiments are for illustrative purposes only and not intended to limit the scope of this disclosure.

EXAMPLE 1

First, 50 g of an ion exchanger (Dowex® 50WX8 hydrogen form, Sigma-Aldrich) is added to 1 L of deionized water (ultrapure water) to carry out acidification, and 5 g of ammonium (meta)vanadate ($H_4NO_3V$) is further added thereto and the resultant mixture is shaked for about 6 hours under 200-250 rpm to obtain a dark brown-colored vanadium oxide solution. The vanadium oxide solution is stored at 50° C. for 90 days to grow vanadium oxide nanowires having a rectangular column shape with a height of 50 μm.

To 90 ml of a solution containing the thus grown vanadium oxide nanowires, 2.5 g of a polyvinyl pyrrolidone is added as a surfactant, and 10 ml of a polyurethane solution is further added to obtain a mixed solution of nanowires.

The mixed solution is poured to a Teflon mold, and dried and cured at 25° C. for 12 hours to form a thin film, which, in turn, is added to 5% aqueous nitric acid solution (etching solution) and shaked for 6 hours under 90-100 rpm to remove the vanadium oxide nanowires contained in the film selectively. Then, the film is dipped into deionized water to remove the etching solution, thereby providing a porous polymer film.

EXAMPLE 2

Example 1 is repeated, except that 10 g of ammonium (meta)vanadate ($H_4NO_3V$) is added to form a porous polymer film.

Comparative Example 1

A commercially available PCTE film (Sterlitech Corporation, USA, PCT00147100) is used. The film is obtained as follows. A polycarbonate thin film is irradiated with ion beams at the portion where pores are to be formed so that the thin film is fired. Then, the thin film is dipped into an etching solution so that cylindrical pores are formed at the damaged portion of the thin film. Herein, the pores have a size of 10 nm.

Comparative Example 2

A commercially available AAO (Anodized Aluminum Oxide) inorganic film (Whatman®, Germany, 6809-5002) is used. The film is obtained by oxidizing aluminum electrochemically. Herein, the pores have a size of 20 nm.

Comparative Example 3

A commercially available PCTE film (Sterlitech Corporation, USA, PCT00347100) is used. The film is obtained as follows. A polycarbonate thin film is irradiated with ion beams at the portion where pores are to be formed so that the thin film is fired. Then, the thin film is dipped into an etching solution so that cylindrical pores are formed at the damaged portion of the thin film. Herein, the pores have a size of 30 nm.

Test Example 1

Determination of Vanadium Oxide Nanowires Using FE-SEM and EDX

Figure 2:
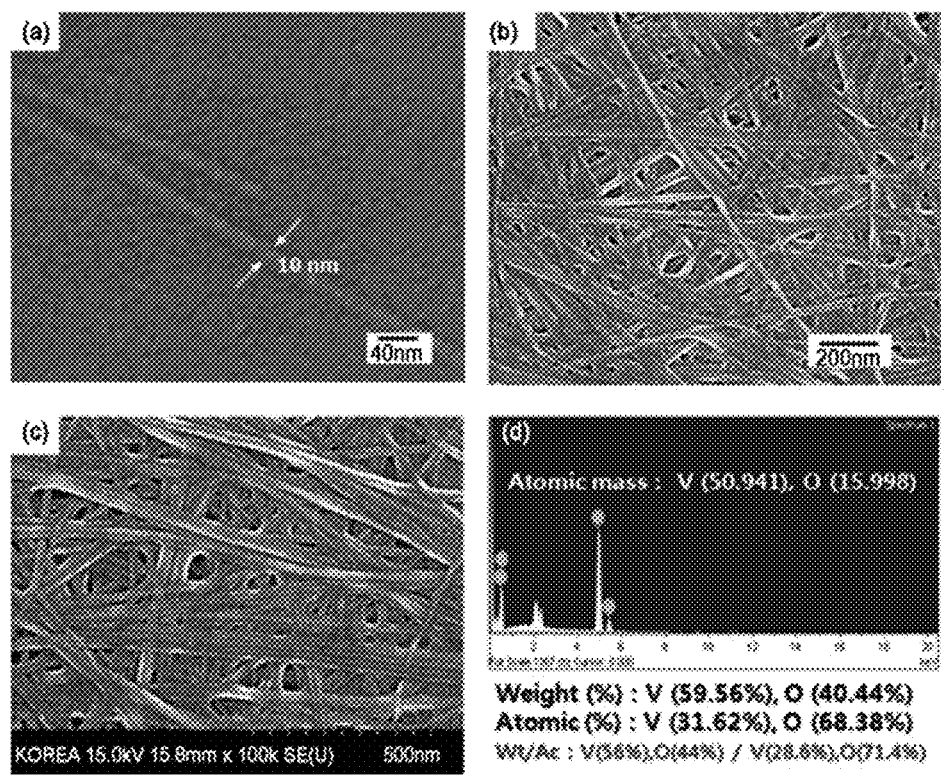
FIG. 2a is a Field Emission-Scanning Electron Microscopy (FE-SEM) image showing the vanadium oxide nanowires obtained according to an embodiment of the present invention.
FIG. 2b is an FE-SEM image (×50,000) showing the solution of vanadium oxide nanowires obtained according to an embodiment of the present invention, after drying.
FIG. 2c is an FE-SEM image (×100,000) showing the solution of vanadium oxide nanowires obtained according to an embodiment of the present invention, after drying.
FIG. 2d is a graph illustrating the results of Energy Dispersive X-ray spectroscopy (EDX) of the vanadium oxide nanowires obtained according to an embodiment of the present invention.

FIG. 2a is a Field Emission-Scanning Electron Microscopy (FE-SEM) image showing the vanadium oxide nanowires obtained according to Example 1. FIG. 2b and FIG. 2c are FE-SEM images showing the solution of vanadium oxide nanowires obtained according to Example 1, after drying. FIG. 2d is a graph illustrating the results of Energy Dispersive X-ray spectroscopy (EDX) of the vanadium oxide nanowires obtained according to Example 1.

As shown in FIG. 2a to FIG. 2c, the vanadium oxide nanowires have a length of 10 nm, and a large amount of vanadium oxide nanowires having a rectangular column shape are present in the solution of vanadium oxide nanowires.

As shown in FIG. 2d, the vanadium oxide nanowires have V (59.56%) and O (40.44%) based on molecular weight, and V (31.62%) and O (68.38%) based on atomic mass.

Test Example 2

Figure 3:
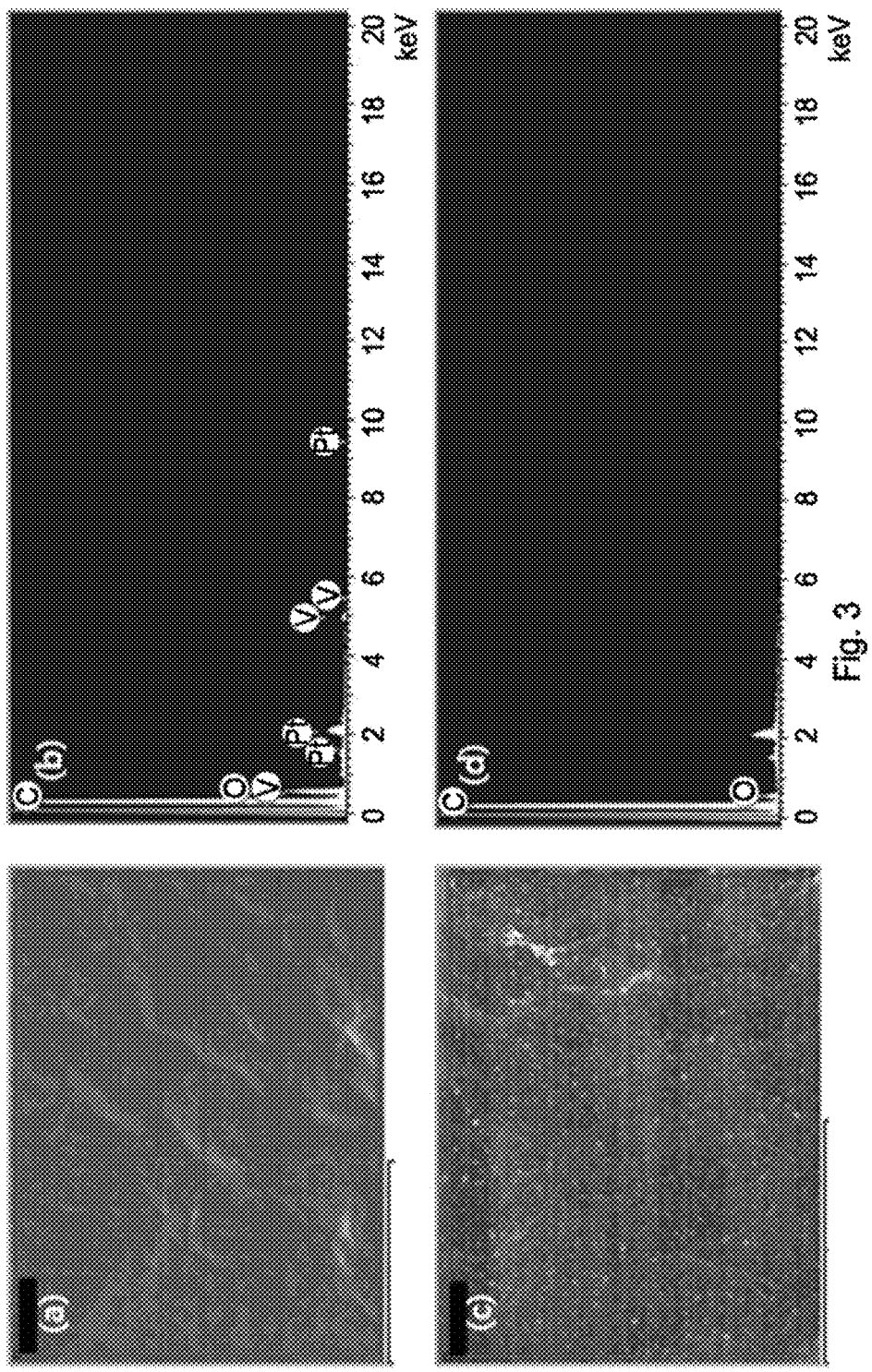
FIG. 3a is an FE-SEM image showing the polymer film obtained according to an embodiment of the present invention, before etching.
FIG. 3b is a graph illustrating the results of EDX of the polymer film obtained according to an embodiment of the present invention, before etching.
FIG. 3c is an FE-SEM image showing the polymer film obtained according to an embodiment of the present invention, after etching.
FIG. 3d is a graph illustrating the results of EDX of the polymer film obtained according to an embodiment of the present invention, after etching.

Determination of Polymer Film Using FE-SEM and EDX (Energy Dispersive X-Ray Spectroscopy) before and after Etching FIG. 3a is an FE-SEM image showing the polymer film obtained according to Example 1, before etching. FIG. 3b is a graph illustrating the results of EDX of the polymer film obtained according to Example 1, before etching. FIG. 3c is an FE-SEM image showing the polymer film obtained according to Example 1, after etching. FIG. 3d is a graph illustrating the results of EDX of the polymer film obtained according to Example 1, after etching.

As shown in FIG. 3a and FIG. 3b, the polymer film before etching has a smooth surface and has chemical ingredients of C, O and V as detected by EDX analysis.

As shown in FIG. 3c and FIG. 3d, the polymer film after etching has a plurality of small pores, suggesting that a porous polymer film is formed. After EDX analysis, the polymer film has only C and O. Thus, it can be seen that the vanadium nanowires are removed due to the etching.

Test Example 3

Determination of Porous Polymer Film Using FE-SEM

Figure 4:
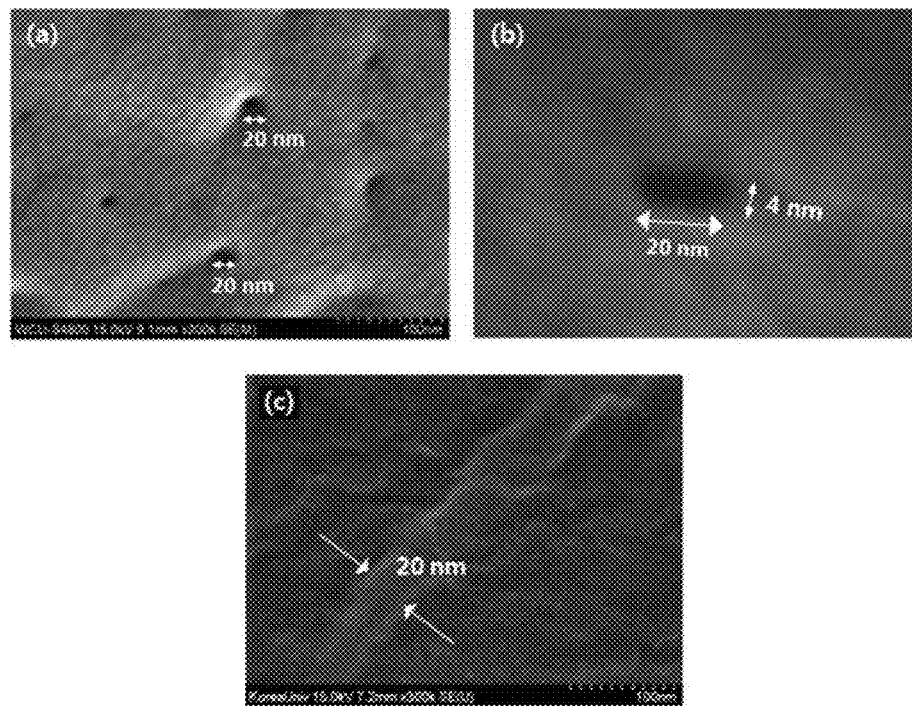
FIG. 4a to 4c are FE-SEM images (×300,000) showing the porous polymer film obtained according to an embodiment of the present invention.

FIG. 4a to FIG. 4c are FE-SEM images showing the porous polymer film obtained according to Example 1. FIG. 4a to FIG. 4c are taken at a magnification of 300,000, and particularly FIG. 4b is an enlarged version of the photograph taken at a magnification of 300,000.

As shown in FIG. 4a to FIG. 4c, the pores in the porous polymer film have a width of 4 nm and a length of 20 nm. The reason why the pores are larger than the vanadium oxide nanowires is that the polymer is also affected by the etching step.

Test Example 4

Determination of Flux of Porous Polymer Film

The flux of distilled water permeating through each of the porous polymer films obtained according to Example 1 and Example 2 is determined and the results are shown in the following Table 1. The results are expressed in a unit of LMH/bar (Liter/$m^2$/hr/bar).

TABLE 1

|  | Example 1 | Example 2 |
| --- | --- | --- |
| Flux of Distilled Water | 26.478 ± 0.044 | 85.569 ± 12.425 |

As shown in Table 1, in the porous polymer film according to an embodiment of the present invention, it is possible to control the flux by adjusting the concentration of vanadium oxide nanowires to control the pore density.

Test Example 5

Determination of Filtering Concentration and Removal Ratio of Gold Nanoparticles (GNP)

Figure 5A:
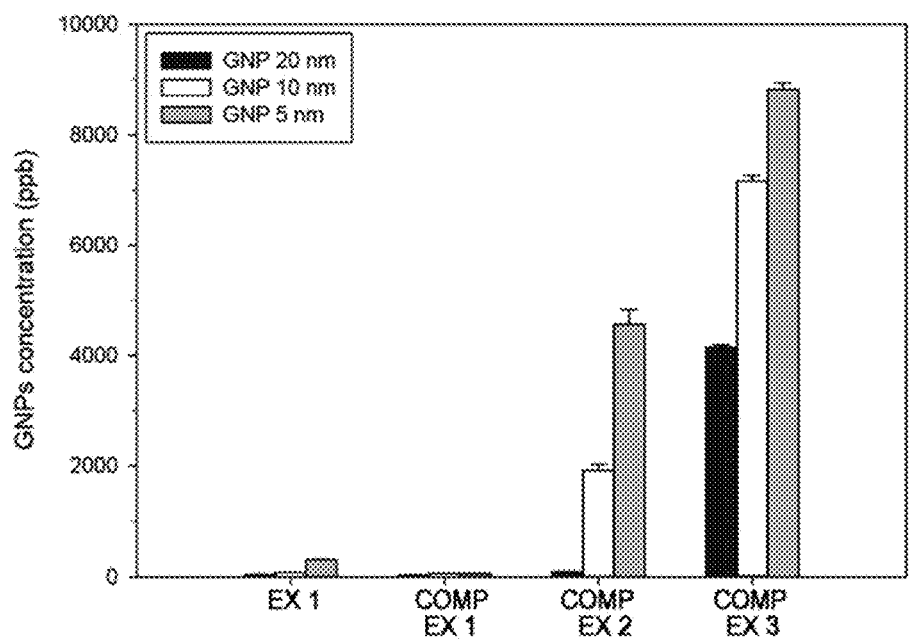
FIG. 5a is a graph illustrating the concentration of gold nanoparticles (GNP) permeating through each of the porous polymer films obtained according to Example 1 and Comparative Examples 1-3, when gold nanoparticles having different particle diameters are allowed to permeate therethrough.
Figure 5B:
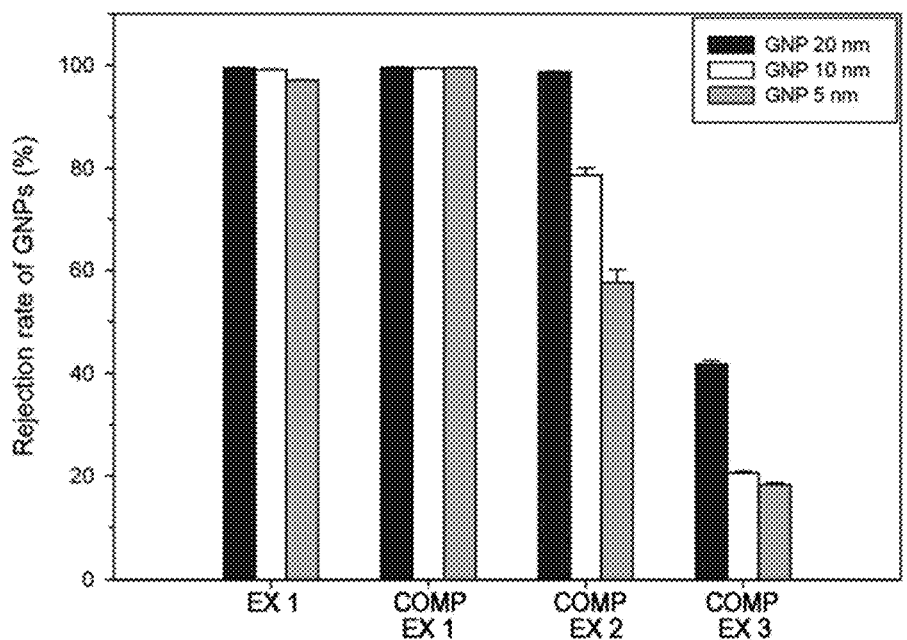

FIG. 5a is a graph illustrating the concentration of gold nanoparticles (GNP) permeating through each of the porous polymer films obtained according to Example 1 and Comparative Examples 1-3, when gold nanoparticles having different particle diameters are allowed to permeate therethrough. FIG. 5b is a graph illustrating the ratio of removal of GNP permeating through each of the porous polymer films in FIG. 5a.

As shown in FIG. 5a and FIG. 5b, the polymer film of Example 1 filters out the gold nanoparticles (GNP) having a particle diameter of 5 nm, 10 nm and 20 nm with better quality as compared to the polymer films according to Comparative Examples 2 and 3. However, the polymer film of Example 1 shows lower filtering quality as compared to Comparative Example 1.

In the same context, for the gold nanoparticles having a particle diameter of 5 nm, 10 nm and 20 nm, the GNP removal ratio of Example 1 is 97.06%, 99.10% and 99.39%; the GNP removal ratio of Comparative Example 1 is 99.47%, 99.38% and 99.51%; the GNP removal ratio of Comparative Example 2 is 55.64%, 78.68% and 98.69%; and the GNP removal ratio of Comparative Example 3 is 18.35%, 20.53% and 41.85%, respectively (FIG. 5b).

Accordingly, while the polymer film of Comparative Example 1 removes gold nanoparticles (GNP) with a higher ratio as compared to the polymer film of Example 1, the polymer film of Example 1 allows passage of a larger amount of water as compared to the polymer film of Comparative Example 1 because the former has rectangular pores but the latter has circular pores.

Test Example 6

Determination of Concentration of *Murine norovirus* after Filtering

Figure 6A:
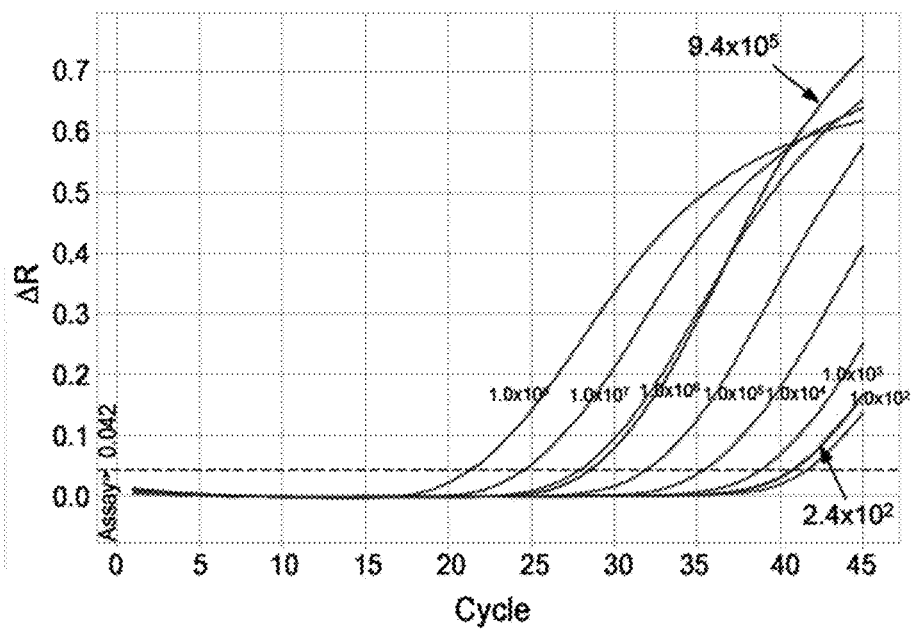
FIG. 6a is a graph illustrating the concentration of *Murine norovirus* before and after permeating through the porous polymer film obtained according to Example 1.
Figure 6B:
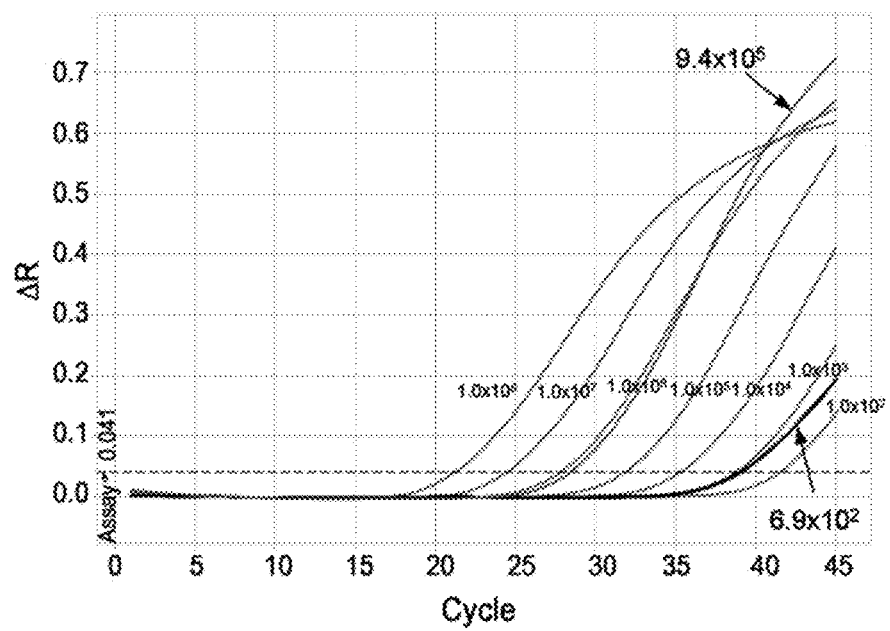
FIG. 6b is a graph illustrating the concentration of *Murine norovirus* before and after permeating through the porous polymer film obtained according to Comparative Example 1.

FIG. 6a is a graph illustrating the concentration of *Murine norovirus* before and after permeating through the porous polymer film obtained according to Example 1. FIG. 6b is a graph illustrating the concentration of *Murine norovirus* before and after permeating through the porous polymer film obtained according to Comparative Example 1.

As shown in FIG. 6a and FIG. 6b, after permeating *Murine norovirus* having a concentration of $9.4 \times 10^6$ through the porous polymer film of Example 1, the concentration is reduced to $2.4 \times 10^2$. In contrast, after permeating Murine norovirus having a concentration of $9.4 \times 10^5$ through the porous polymer film of Comparative Example 1, the concentration is reduced to $6.9 \times 10^2$.

Therefore, it can be seen that the polymer film of Example 1 provides a higher removal ratio of *Murine norovirus* as compared to the polymer film of Comparative Example 1.

While the present invention has been described with respect to the specific embodiments, it will be apparent to those skilled in the art that various changes and modifications may be made without departing from the spirit and scope of the Invention as defined in the following claims.

What is claimed is:

1. A method for producing a porous polymer film using vanadium oxide nanowires as a template to allow control of a uniform pore size and density of the porous polymer film, the method comprising the steps of:
    (A) adding an ion exchanger to deionized water to perform acidification to a pH of 2.0-2.5 and adding a vanadate compound thereto to grow vanadium oxide nanowires by a sol-gel process, producing a resultant solution of grown nanowires;
    (B) mixing the resultant solution of grown nanowires with a polymer solution and a surfactant to provide a mixed solution of nanowires;
    (C) pouring the mixed solution of nanowires to a mold, followed by drying and curing, to form a film; and
    (D) etching the resultant film with an etching solution to remove the vanadium oxide nanowires,
    wherein the polymer solution is provided in step (B) in an amount of 10-30 parts by weight per part by weight of the vanadate compound,
    wherein the surfactant is mixed in an amount of 10-70 parts by weight based on 100 parts by weight of the polymer solution, and
    wherein the pores in the porous polymer film have a rectangular column shape.

2. The method according to claim 1, wherein the vanadate compound and ion exchanger are mixed in a weight ratio of 1:5-30, in step (A).

3. The method according to claim 1, wherein the vanadate compound is ammonium (meta)vanadate or sodium vanadate, in step (A).

4. The method according to claim 1, wherein the polymer solution comprises a polymer selected from the group consisting of a polyurethane, polyethylene, polysulfone, polyvinylidene fluoride, and copolymers thereof, in step (B).

5. The method according to claim 1, wherein the pores are formed to have a width of 2-8 nm, a length of 10-30 nm and a height of 15-50 μm.

6. A porous polymer film obtained by the method as defined in claim 1.

7. The method according to claim 1, wherein the vanadium oxide nanowires are grown at a temperature ranging from 45-55° C.

\* \* \* \* \*